Dec. 4, 1934.  A. BLONDEL  1,983,435
RADIO SIGNALING SYSTEM
Filed July 3, 1933   3 Sheets-Sheet 1
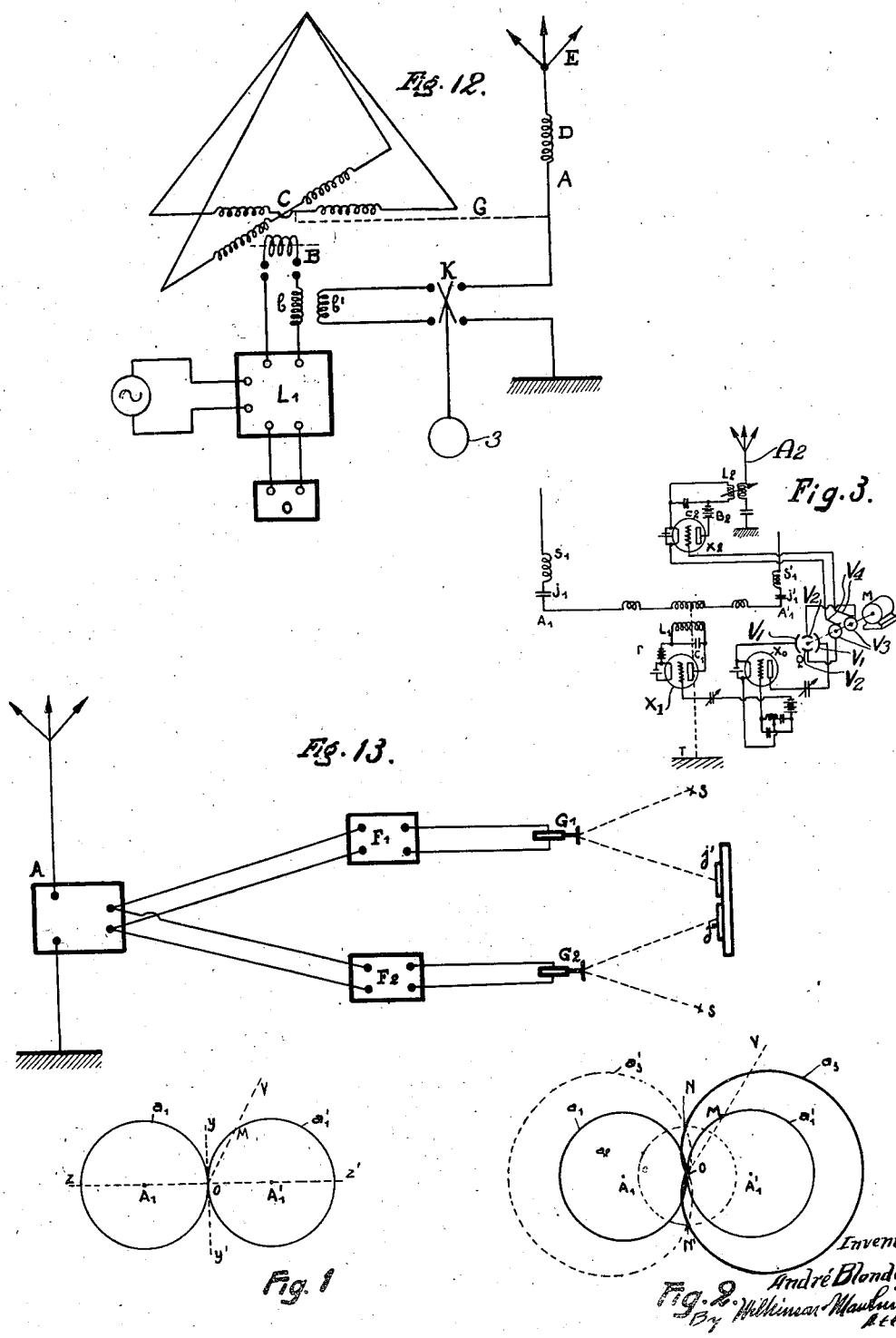
Inventor:
André Blondel,
By Wilkinson Mawhinney
Attys.

Dec. 4, 1934.  A. BLONDEL  1,983,435
RADIO SIGNALING SYSTEM
Filed July 3, 1933  3 Sheets-Sheet 2
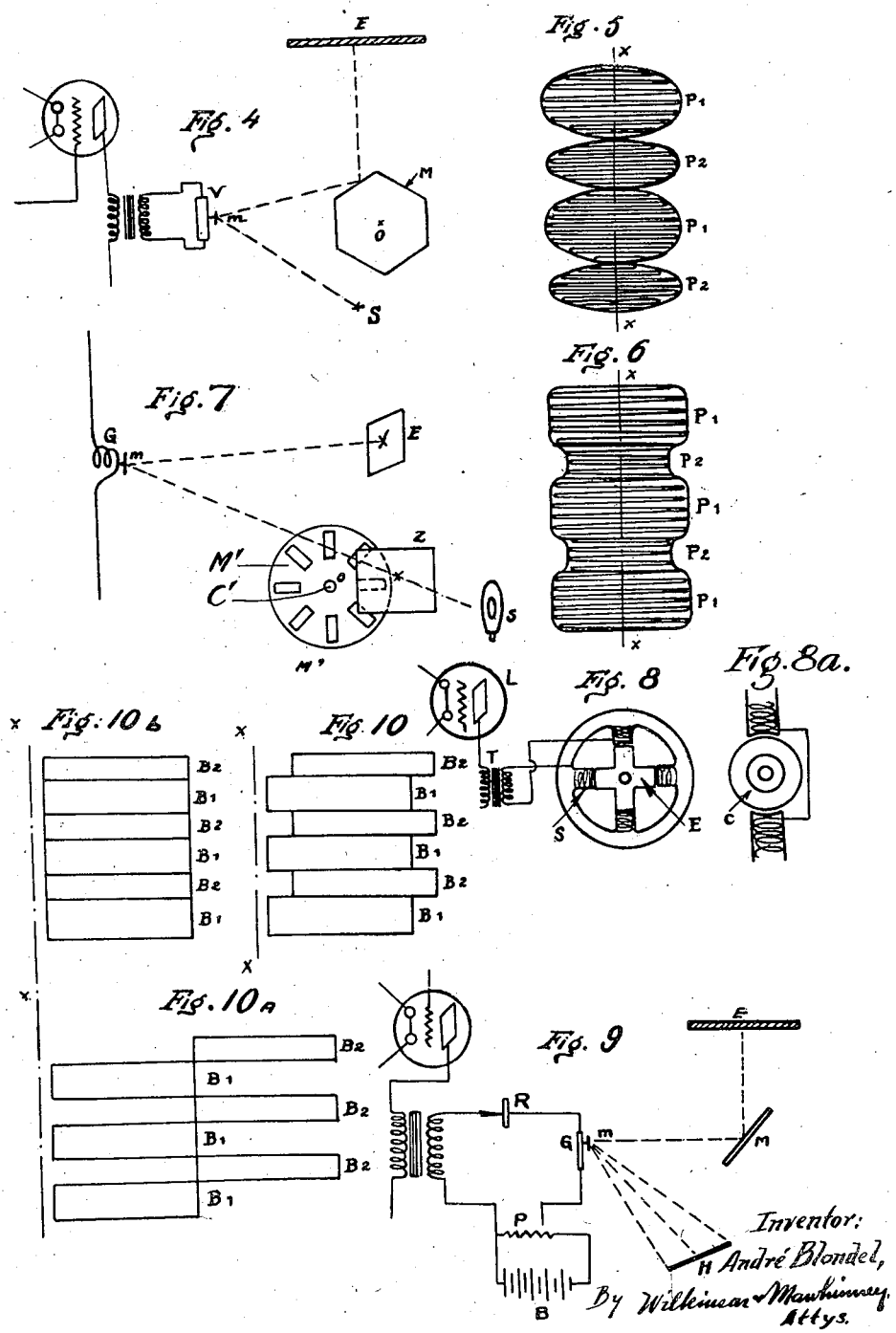

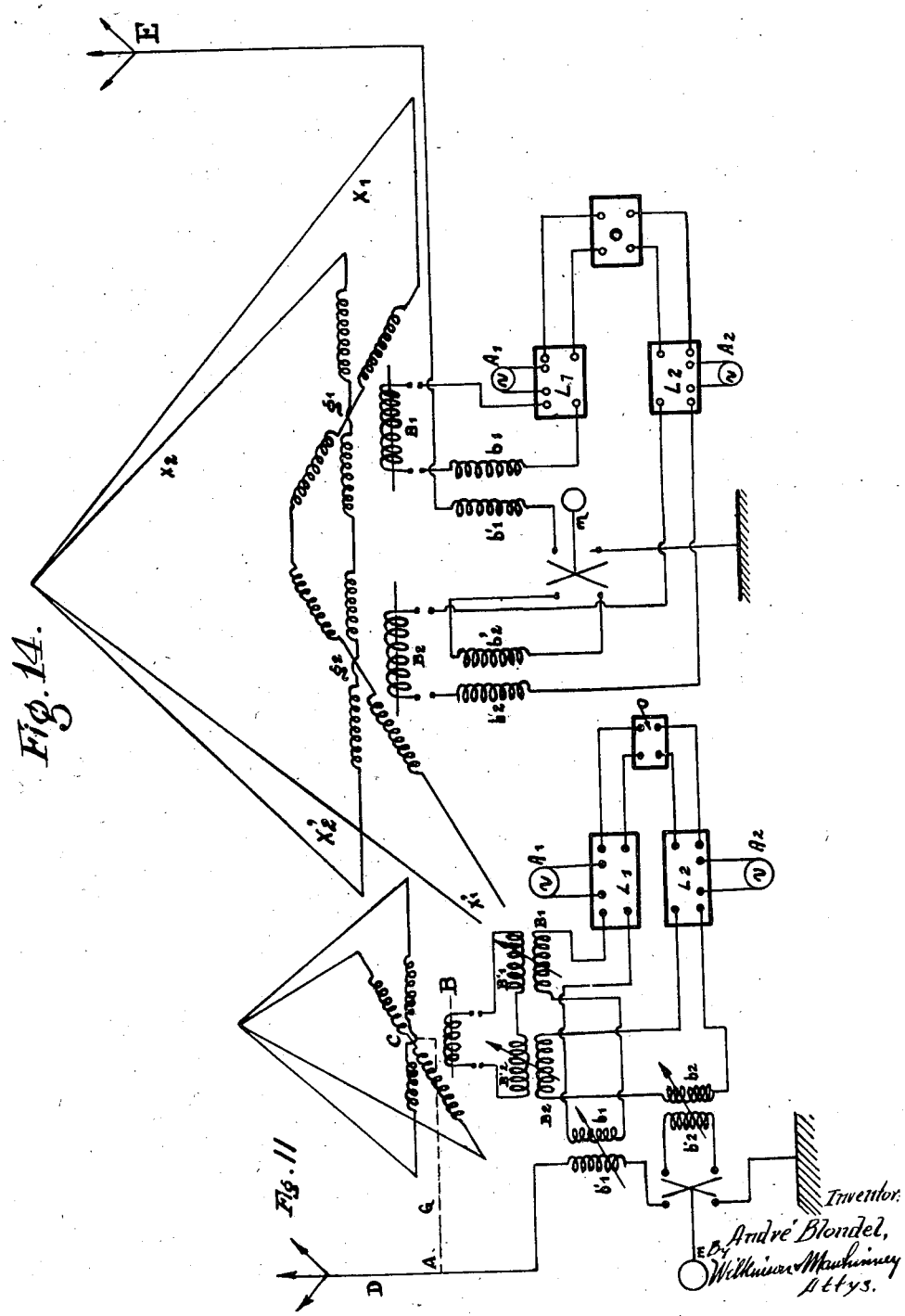

Patented Dec. 4, 1934

1,983,435

UNITED STATES PATENT OFFICE 1,983,435

RADIO SIGNALING SYSTEM

André Blondel, Paris, France

Application July 3, 1933, Serial No. 678,975
In France July 9, 1932

5 Claims. (Cl. 250—11)

The present invention relates to radio-goniometric signaling systems for marking out a predetermined alignment and thus affording a bearing to a navigator.

A principal object of the present invention is to provide visual and combined visual and audible means whereby the navigator may distinguish the radio-goniometric signals transmitted.

Another object of the present invention is to provide improvements in the radio-goniometric transmitting apparatus.

With these and other objects in view, the invention is characterized by the combinations and arrangements of parts hereinafter described with reference to the appended drawings and as more particularly pointed out in the accompanying claims:

Figure 1 illustrates the directional field strength curve of a closed frame aerial.

Figure 2 illustrates the resultant directional field strength curve formed by superposition of the fields of a closed frame aerial and a single antenna.

Figure 3 illustrates a radio-goniometric transmitting apparatus for marking out a given alignment using a frame aerial associated with a single vertical antenna.

Figure 4 illustrates an apparatus for the visual reception of the radio-goniometric signals emitted by the apparatus of Figure 3.

Figure 5 is a diagram of the luminous vibrations obtained with the apparatus of Figure 4.

Figure 6 is a diagram of the luminous vibrations obtained with the receiving apparatus of Figure 4, in conjunction with a modified form of transmission.

Figure 7 illustrates a modification of the visual receiving apparatus disclosed in Figure 4.

Figure 8 illustrates a device that may be associated with the receiving apparatus of Figure 4 for controlling the rotation of the distorting mirror.

Figure 8a illustrates a modification of the device shown in Figure 8.

Figure 9 illustrates another modification of the receiving apparatus illustrated in Figure 7.

Figures 10, 10a and 10b are diagrams of the luminous vibrations obtained with the transmitting apparatus of Figure 11.

Figure 11 illustrates a modified form of transmission apparatus.

Figure 12 illustrates a simplified form of the transmission apparatus of Figure 11.

Figure 13 illustrates a modified form of receiving apparatus associated with the transmission apparatus of Figure 11.

Figure 14 illustrates yet another modification of a transmission apparatus.

In investigating the directional field strength curve of a closed frame aerial, only the two vertical portions thereof need be considered, and hence the aerial may be likened to two antennae $A_1$ and $A'_1$ (Figure 1) excited synchronously and in phase opposition by the same oscillator, and their directional field strength curve takes the form of two tangential ovals, which, if it be assumed that the distance between the two antennae is equivalent to ⅙ of their wave length, become two tangential circles $a_1$ and $a_2$.

The field strength of the frame aerial in the direction OV for example, where O is the tangent point of the two circles $a_1$ and $a_2$ is proportional to the vector OM where M is the point of intersection of the line OV with the corresponding circle $a'_1$. It follows that the maximum field strength is in the direction OZ, OZ', whereas in the directions OY, OY', such field strength is reduced to zero.

If now the closed frame aerial $A_1$, $A'_1$ be associated with a single vertical antenna $A_2$ and the latter be fed by the same oscillator as the closed frame aerial $A_1$, $A'_1$ in such wise that its phase of oscillation is the same as the phase of the middle of the frame aerial $A_1$, $A'_1$, then if the antenna $A_2$ be placed at the center of the closed frame $A_1$, $A'_1$, its directional field strength curve will be illustrated by the dotted line circle $a_2$ of Fig. 2.

Then the resultant directional field strength curve $a_3$ obtained by superposition of the circles $a_1$, $a'_1$ and $a_2$ will approximate to a cardioid.

Similarly, by reversing the phase of oscillations either in the single antenna $A_2$ or in the frame aerial $A_1$, $A'_1$, the symmetrical curve $a'_3$ is obtained which intersects the curve $a_3$ in the points N, and N'$_1$.

When the line joining the navigator and the origin O passes through the points $N_1$ or $N'_1$, the signal strengths are equal and the navigator knows that he lies on the particular bearing signalled by the radio-goniometric station.

Figure 3 illustrates a known type of apparatus for transmitting radio-goniometric signals.

In Figure 3, the frame aerial is illustrated diagrammatically by its vertical portions $A_1$, $A'_1$ while the single vertical antenna is shown at $A_2$. The frame aerial $A_1$ $A'_1$ which may include oscillator circuits $S_1$, $j_1$ and $S'_1$, $j'_1$ is fed from a triode $X_1$ through a coupling $L_1$, $L'_1$ whereas the antenna $A_2$ is fed from a second triode $X_2$.

A triode $X_0$ controls the triode $X_1$, directly and the triode $X_2$ through a phase reversing device an embodiment of which has been illustrated in Figure 3. This device comprises a rotatable condenser Q having two fixed plates $q_1$ connected to the plate-filament circuit of the triode $X_0$ and two rotatable plates $q_2$ connected, for example by slip rings $q_3$ and brushes $q_4$ to the filament and grid of the valve $X_2$. Said rotatable plates $q_2$ may be driven by a motor M to rotate in relation to the plates $q_1$. Thus the high frequency oscillations produced in the plate circuit of the valve $X_0$ and transmitted to the valve $X_2$ may be reversed in phase in the grid-filament circuit of said valve $X_2$ by the action of the condenser Q.

It therefore follows that the phase of the antenna $A_2$ may be reversed and hence the two cardioids obtained in the manner hereinbefore described.

Moreover by a suitable arrangement of cams (not shown), it is easy to modify the directions of concordance of phase of the antenna $A_2$ with the antennae $A_1$ and $A'_1$ respectively.

Moreover any of the known systems are employed for modulating the oscillations of the aerial $A_1$, $A'_1$ and the antenna $A_2$ at the same or different frequencies.

It will be understood that the foregoing is a description of known methods and apparatus for emitting radio-goniometric signals for marking out a particular alignment.

The present invention is concerned with methods and apparatus for giving the navigator a visual or combined audible and visual indication of the transmitted signals and it is likewise concerned with certain improvements in the transmitting apparatus.

Reception is effected through the medium of an ordinary antenna or any type of aerial, acting on a high frequency receiver, frequency of the carrier wave, followed by detection and low frequency amplification, frequency of modulation at the sending end to which reference has already been made.

Instead of connecting the output valve of the receiving apparatus to an audible receiver (telephone or loud speaker), it is connected, according to the present invention, either to a vibrating galvanometer tuned to the musical frequency of modulation or through a rectifier (rectifying valve or copper oxide rectifier or of any type) to an ordinary galvanometer the frequency of which is sufficient to follow the rate of reversal of the current, for example having a frequency five to ten times as great as the rate of inversion.

These galvanometers must be suitably damped to reproduce the rate of transmission at the critical aperiodicity so as to be able to follow the rate of reversal of the antenna coupling.

In both cases, the mirror of the galvanometer projects on to a ground glass, the oscillations of an image emanating from a luminous point or slit source parallel to the deviations.

Moreover, the source or image is displaced in the perpendicular direction either by means of a slit disc or by means of a rotating mirror, as for example in the oscillographs or the known methods employed in television.

If the two transmission maxima with reversed antenna connections are received with the same intensity, the deviations of the galvanometer will be the same; if, on the contrary, one transmission is stronger than the other, a difference in the deflections is immediately perceived.

The two emissions are distinguished one from the other either by the length of each emission between two reversals of the excitation of the antenna or of the aerials, or by the frequency of modulation.

I shall describe first of all the devices used for obtaining a visual comparison of the strength of the emissions radiated, with reversal of the antenna connections. In the first place, in the circuit of the last valve of the low frequency amplifier, Fig. 4, there is inserted a resonant oscillograph galvanometer comprising a vibrating member V carrying a small mirror $m$ illuminated by a luminous point source S, the rays of which are reflected by a mirror M rotating about any axis O or O' on to a ground glass E which spreads the spot oscillations of the mirror $m$ which swings about a vertical axis.

The rotating mirror M spreads the oscillations in a perpendicular direction, and luminous vibrations are thus obtained on the ground glass as represented for example in Fig. 5, which vibrations are symmetrical about an axis XX and the amplitudes of which are all the greater as the output current of the valve is greater, the areas $P_1$ correspond, for example, to half a rotation of the phase reversing member between the antenna and the exciting circuit of the frame or frames of the sending station, while the areas $P_2$ correspond to another half-rotation performed at a speed twice as great for example; whereby the areas $P_1$ may be readily distinguished from the areas $P_2$ due to the fact that their height is twice as great.

In the case of Fig. 5, it has been assumed that the navigator is situated on the alignment to be marked out. The two sets of signals received are consequently of equal strengths and hence the maximum amplitudes of the areas $P_1$ and $P_2$ are equal.

Fig. 6 illustrates a modification where the phase of the oscillation of the single transmitting antenna is reversed abruptly instead of progressively, either by considerably increasing the speed of rotation of the rotating condenser Q, or by inserting a reversing switch in a manner presently to be described. The areas $P_1$, $P_2$ are still distinguishable by a difference of breadth, they may still follow in perfectly regular succession. They may have the profile of interlocked Morse letters when the aeroplanes are not equipped with the device for visual reception but have only a telephone.

Such interlocking is only necessary for earpieces or for simultaneous visual and audible reception.

The device of Fig. 4 may be subjected to various modifications. In the first place the vibrating galvanometer which is tuned to the modulation frequency may swing about a horizontal instead of a vertical axis, in which case the plane or polygonal rotating mirror M must rotate about a vertical axis since the two axes of adjustment must always be perpendicular to each other. The rotating mirror M may be replaced by an oscillating mirror like that of the oscillograph synchronoscope.

Manually rotated mirrors produce on the ground glass successive images which do not join up since the speed of rotation is variable. Should a continuous image be desired, the mirror may be rotated or swung in a continuous manner by means of a motor synchronized by the frequency of modulation of the waves received.

This may be accomplished by providing an additional valve L at the receiving end, as illustrated in Fig. 8, said valve being energized by the low frequency current, its plate acting directly or through a transformer T on a stator or rotor synchronizing member of a synchronous or asynchronous motor, according to the known methods, similar to the phonic wheel, which is here synchronized by the modulation of the carrier wave.

Motors similar to those used for synchronizing clocks may likewise be used. For example, on the shaft of a direct current motor C (Fig. 8a) which drives the rotation or oscillation mechanism of the synchronoscope, there is mounted an iron star E (Fig. 8) rotating between the poles of a stator S excited by the valve L modulated by the receiving station at the frequency of modulation of the receiving station.

When the phase reversals of the single transmitting antenna are practically equidistant, one of the modulating audio-frequencies may be separated at the receiving station, when two obtain, and a rectified current is thus obtained which has maxima and minima values of any magnitude. By detecting a second time, there is obtained, after transformation, an alternating current which may synchronize a motor or the phonic wheel at the frequency of the reversals instead of at the frequency of modulation.

According to a modification of the invention, as disclosed in Fig. 9, the vibrating galvanometer V in the device of Fig. 4 is replaced by a non-resonant galvanometer G receiving the current of the low frequency amplifier, through any type of rectifier R. This galvanometer may be bifilar or have a small frame with a bifilar or unifilar suspension, or be an apparatus of any telephone receiver type, having a frequency of 10-100 periods per second.

The mirror of the galvanometer G is then illuminated by a point or, better still, a horizontal luminous line H which may be part of the electric filaments or images of said filaments or may be a horizontal slot illuminated over its length by an appropriate source.

The illuminated areas of Figs. 5 and 6, are then replaced by strips having parallel edges $B_1$ and $B_2$ which move to the right (or to the left) of the axis XX as is shown in Fig. 10.

In the case of rotating the radio-goniometric signals, Fig. 10a shows that when the navigator is almost in the azimuth in which the antenna is reversed, the areas $B_1$ and $B_2$ join up and when their edges are in perfect alignment (Fig. 10b) so that only a single strip is seen, a warning is thus given that the azimuth to be defined has been reached.

This azimuth may be determined for example by means of a chronometer, by noting the time which elapses between the moment when the rotating coils of the signalling apparatus pass through a given azimuth, North for example, and the moment when the luminous strip after having assumed the form of Fig. 10, or even of Fig. 10a, again displays edges that join up along two straight lines.

In the cases of Figs. 10 and 10a, the navigator knows that he is to the left or to the right of the azimuth sought for, by the fact that a large strip $B_1$ lies to the right or to the left of the narrow strip $B_2$. He thus always knows the course he must steer in order to draw nearer the azimuth sought for.

In the modification of Fig. 9, it is assumed that the galvanometer V or G of Fig. 4 is connected directly in series in the circuit of the detector valve. The displacement of the spot is then adjusted, for example by means of a potentiometer P mounted in parallel (or of a battery B which plays the same part) to bring back the spot towards the middle of the screen when reception is strong. With the same end in view, the circuit of the vibrating galvanometer is shunted; obviously rheostats, condensers, etc. may be mounted in parallel or in series in the circuit of the galvanometer.

To facilitate measurement of the time, a signal may be automatically transmitted by a separate antenna, and if the carrier wave of said antenna is modulated at a different frequency from that of the goniometric signals, it may be used either to actuate a separate vibrating galvanometer which shifts or widens the spot on the screen, to warn the navigator to start up his watch, or else it may actuate a relay which sets going the seconds needle of a chronometer mounted on the same panel as the observation screen.

Said observation screen instead of being horizontal as illustrated in Figs. 4 and 9, may be vertical, oblique or arranged in any other manner. Instead of observing on the screen, the vibrating image of the galvanometer may be observed directly through the medium of the swinging or rotating mirror M.

Instead of a separate signal for the azimuth serving as origin, the transmission or the modulation of the sending station may be stopped for a short interval by a switch, whereby a black spot appears in the image distorted by the mirror M of Fig. 4.

Fig. 7 shows a modification wherein the rotating mirror M is replaced by a disc M' rotating on a spindle C'. Said disc has radial slots which pass periodically before a screen Z illuminated as strongly as possible by a powerful source S, or which is formed by a plate neon valve as for television. If the galvanometer G is of the non-resonant type as in Fig. 9, each slot in the disc M', as it moves about a horizontal position, produces on the screen E, through the medium of the mirror $m$, a substantially parallel image which shifts at the same time and which produces a luminous strip displaced to the right and to the left as in Figs. 10a and 10b by the mirror $m$ as it rotates about its axis of suspension G.

The slot may be as short as desired, or may be replaced by equidistant holes. If the galvanometer G vibrates in resonance, as in the case of Fig. 4, it will produce zig-zags on the screen as in Figs. 5 and 6.

Fig. 6 shows that the rectangles may have rounded edges due to the time required by a vibrating galvanometer to pass suddenly from a given deflection to a greater one. Rounded corner may likewise obtain in the case of Figs. 10 and 10a.

Fig. 13 shows two vibrating galvanometers G' and G'' fed through the medium of two filters $F_1$ and $F_2$ which separate the frequencies (case of two different modulations).

The mirrors of these galvanometers throw the light from one or two luminous, point or slit sources in the form of two fixed luminous strips J' and J'' which are of unequal width so long as the observer is not in the plane of alignment. He may compare their widths either by looking at the fixed stripes produced by the two spots, or at the strips of light spread out alongside each other by the oscillating or rotating mirror of Fig. 4.

A similar method, but carried out differently, consists in applying to the described sending stations two different modulating frequencies (or three if a third frequency is used in the additional antenna designating the alignment of a known cardinal point), each of these frequencies modulating at the receiving end the current in one or the other of the galvanometers.

While periodically reversing the connections of the antenna or those of the movable frame, one frequency is substituted for the other by replacing the alternator which feeds the audio-frequency valves by another alternator which acts either on the grid or on the plate circuits. Fig. 11 illustrates a device of this type, wherein $A_1$ is an alternator having a certain frequency, for example 100, and $A_2$ another alternator having a frequency of 250 for example, said alternators being fed through the medium of a voltage transformer or a common transformer. The fields of the alternators are suitable adjusted, and if necessary resistances are inserted in series, so that the two signals produced by the low frequency at the output of the final valves (amplifiers or detectors as desired) shall have the same amplitude at the receiving end.

In this case, the rotating mirror of Fig. 4 which spreads the curves may be dispensed with and the single vibrating galvanometer V replaced by two other similar ones respectively tuned to the audio-frequencies and connected to the output valve by electric filters in order to properly separate said audio-frequencies. The two galvanometers thus tuned give deflections alternately, the amplitudes of which are compared on the screen, as has been stated above (in the case of Fig. 11); one of said amplitudes applies to the space region situated on the right of the direction marked out, whereas the other applies to the space region situated on the left.

To facilitate comparison, the phase reversals of the transmitting antenna must be made as frequently as possible and galvanometers having preferably less damping should be used.

Matters are facilitated if the vibrating galvanometer be replaced by two low frequency galvanometers (for example having a period of oscillation of a few tenths of a second) receiving respectively the rectified currents through a detector valve or any type of rectifier and the mirrors of which are each illuminated by a luminous line, as has been explained in connection with Fig. 9.

The two deviations are again compared as above.

By way of alternative, a two-frequency system may be used in combination with a double aerial system of the Bellini-Tosi type.

2. Arrangement of the aerials.

Fig. 12 illustrates a single modulation transmission device having a single rotating coil coupled to the two frames. This system enables the fixed or rotating alignment to be perceived audibly or visually, or both combined at the receiving end. The antenna is coupled by the coil $b, b'$ and the current reversed by the reversing switch K driven by a motor $z$.

The antenna circuit A D E may be replaced by a wire A G C connected directly to a neutral point C common to the two coils of the gonio-variometer so that the earth-aerial circuit shall act like an antenna.

In all cases, the phase of the antenna D must be adjusted so that it will correspond to the mean base potential of the two antennae of the gonio-variometer.

The direction of the phase of the antenna D may likewise be suddenly changed by means of the reversing switch K. In this case, the relative duration of the antenna couplings in one direction or the other may be equal or different at will; in the latter case it is still possible to use the telephone listening-in system should the optical device get out of order.

The invention resides in the fact that the aerials are excited by the gonio-variometers which may be constituted according to the devices illustrated in Fig. 14, wherein $A_1$ and $A_2$ are two alternators of different frequencies feeding two groups of transmitting valves, not illustrated, contained in two cabinets $L_1$ and $L_2$, for producing carrier waves of the same frequency, but which are modulated at the frequencies of $A_1$ and $A_2$. The carrier waves may be generated by a common master oscillator of known type. The transmission group $L_1$ excites through the medium of the coils $B_1$ and $b_1$ respectively, a first gonio-variometer $G_1$ and the coil $b'_1$ of the antenna E, whereas the second amplifier group $L_2$ excites through the coil $b_2$, the coil $b'_2$ of the circuit of the antenna E, but in the opposite direction to the excitation produced by $b_1$ on $b'_1$.

The frame of the gonio-variometers $G_1$, $G_2$ is connected in series with the aerials $X_1$, $X'_1$, $X_2$ $X'_2$ respectively. Similarly, the field coils of the circuit $b'_1$, $b'_2$ of the antenna are connected in series.

The two coils $B_1$, $B_2$ are mounted together on the same shaft which has not been illustrated, and which is caused to rotate at an approximately constant speed by means of an electric motor not illustrated. The amplifications of the valves contained in the cabinets $L_1$, $L_2$ and the coils $B_1$ and $B_2$ are adjusted so that the two fields produced at the two different frequencies shall have the same amplitude; but said fields are offset through a certain angle corresponding to that of the coils $B_1$ $B_2$ assuming the orientations of the two coils $G_1$ $G_2$ are the same.

When the navigator is in the azimuth for which the two fields are equal, the deflections of the two galvanometers of the receiving station $G_1$ $G_2$ of Fig. 7 are equal.

Fig. 11 is a modification wherein the two oscillator systems contained in the cabinets $L_1$ $L_2$ and modulated at different frequencies by the alternators $A_1$, $A_2$ respectively excite two circuits $b_1$, $B_1$ and $b_2$ $B_2$ which act inductively on the coils $b'_1$, $b'_2$ of the antenna and on two induced coils $B'_1$ $B'_2$ placed in circuit with the coil B which is the rotating coil of the single gonio-variometer G. Matters are arranged so that the coil B receives equal currents from $L_1$ and $L_2$.

The coils $B'_1$ $B'_2$ or $b'_1$ $b'_2$ are so wound that the effects produced by the antenna shall be opposite for the two frequencies as also in Fig. 8.

I claim:

1. In radio receiving systems for indicating an alignment to a navigator, a receiving circuit responsive to incoming signals consisting in two interlocked and periodical sets of wave trains of unequal length, a mirror oscillographic galvanometer mounted in said circuit and responsive to the oscillations set up therein, a fixed light source for illuminating said mirror, a screen on which said mirror is adapted to project in parallel directions sets of interlocked images having amplitudes proportional to the field strengths of said two sets of wave trains, and means for spreading, at as slow a rate as desired, said images in a direction perpendicular to that of their amplitudes.

2. Radio-receiving system according to claim 1, in combination with a rotating slotted disc located between said light source and said galvanometer mirror and the slots of which are adapted to spread the image thrown by said mirror in a direction perpendicular to that of their amplitudes.

3. Radio receiving system according to claim 1, wherein the image spreading means comprise a synchronoscopic mirror on which said galvanometer mirror is adapted to reflect the light rays falling on it from said light source.

4. In radio-receiving systems for indicating an alignment to a navigator, a receiving circuit responsive to incoming signals consisting in two interlocked and periodical sets of wave trains of unequal length, means for rectifying the current oscillations in said receiving circuit, an appropriate damped mirror galvanometer responsive to said rectified current oscillations, a fixed light source for illuminating said mirror, a screen on which said mirror projects the alternate deviations of the luminous spot of the galvanometer deflected alternately by the two sets of wave trains, said images shifting with respect to a fixed axis according to the directional field strengths of the signals received, and means for spreading the deviations of said images in a direction perpendicular to that of their amplitudes.

5. In radio-receiving systems for indicating an alignment to a navigator, a receiving circuit responsive to incoming signals consisting in two interlocked and periodical sets of wave trains of unequal length but same frequency, a mirror galvanometer mounted in said circuit and suitably responsive to the oscillations set up therein, a fixed light source for illuminating said mirror, a screen on which said mirror is adapted to project in parallel directions sets of interlocked images having amplitudes proportional to the field strengths of said two sets of wave trains, and a movable mirror for viewing and spreading said images.

ANDRÉ BLONDEL.